US009252399B2

(12) United States Patent
Chamberlain, II et al.

(10) Patent No.: US 9,252,399 B2
(45) Date of Patent: Feb. 2, 2016

(54) PRISMATIC STORAGE BATTERY OR CELL WITH FLEXIBLE RECESSED PORTION

(75) Inventors: Richard V. Chamberlain, II, Fairfax Station, VA (US); Raymond G. Kairawicz, Watertown, CT (US); Jan-Roger Linna, Boston, MA (US); Per Onnerud, Framingham, MA (US); Yanning Song, Chelmsford, MA (US)

(73) Assignee: Boston-Power, Inc., Westborough, MA (US)

( * ) Notice: Subject to any disclaimer, the term of this patent is extended or adjusted under 35 U.S.C. 154(b) by 479 days.

(21) Appl. No.: 12/814,821

(22) Filed: Jun. 14, 2010

(65) Prior Publication Data

US 2011/0033734 A1 Feb. 10, 2011

Related U.S. Application Data

(60) Provisional application No. 61/187,552, filed on Jun. 16, 2009.

(51) Int. Cl.
| | |
|---|---|
| *H01M 2/02* | (2006.01) |
| *H01M 2/04* | (2006.01) |
| *H01M 2/26* | (2006.01) |
| *H01M 2/34* | (2006.01) |
| *H01M 4/505* | (2010.01) |

(Continued)

(52) U.S. Cl.
CPC .......... *H01M 2/0217* (2013.01); *H01M 2/0202* (2013.01); *H01M 2/027* (2013.01); *H01M 2/0275* (2013.01); *H01M 2/0426* (2013.01); *H01M 2/26* (2013.01); *H01M 2/34* (2013.01); *H01M 4/505* (2013.01); *H01M 10/0525* (2013.01); *H01M 2/1229* (2013.01); *Y02E 60/122* (2013.01)

(58) Field of Classification Search
None
See application file for complete search history.

(56) References Cited

U.S. PATENT DOCUMENTS

| 4,567,121 A | 1/1986 | Gilmour |
| 5,744,261 A | 4/1998 | Muffoletto et al. |
| 5,958,088 A * | 9/1999 | Vu et al. .............. 29/623.1 |

(Continued)

FOREIGN PATENT DOCUMENTS

| CN | 1728436 | 2/2006 |
| CN | 100448092 | 12/2008 |

(Continued)

OTHER PUBLICATIONS

Notification of Transmittal of the International Search Report and the Written Opinion of the International Searching Authority for Int'l Application No. PCT/US2010/038454; Date Mailed: Jan. 7, 2011.

(Continued)

*Primary Examiner* — Ula C Ruddock
*Assistant Examiner* — Tony Chuo
(74) *Attorney, Agent, or Firm* — Hamilton, Brook, Smith & Reynolds, P.C.

(57) ABSTRACT

A battery includes a cell casing that has recessed portion on a major surface of the casing, the recessed portion being substantially planar and bordering a remainder of the major surface at a ridge portion on each of one or two sides of the recessed portion, whereby the recessed portion, the ridge portions, and the remainder of the major surface cooperate under an increase of gauge pressure to cause a plane defined by a boundary between the ridge portions and the remainder of the major surface to move.

22 Claims, 9 Drawing Sheets

(51) Int. Cl.
*H01M 10/0525* (2010.01)
*H01M 2/12* (2006.01)

(56) References Cited

U.S. PATENT DOCUMENTS

| | | | |
|---|---|---|---|
| 6,232,015 | B1* | 5/2001 | Wyser ............................ 429/176 |
| 6,430,517 | B1 | 8/2002 | Williams |
| 6,444,350 | B1 | 9/2002 | Toya et al. |
| 6,767,667 | B1 | 7/2004 | Ooshima |
| 7,763,386 | B2 | 7/2010 | Hosoya et al. |
| 8,148,946 | B2 | 4/2012 | Takeda et al. |
| 2003/0001578 | A1 | 1/2003 | Lam |
| 2003/0063900 | A1 | 4/2003 | Wang et al. |
| 2003/0122527 | A1 | 7/2003 | Yugo et al. |
| 2005/0077878 | A1 | 4/2005 | Carrier et al. |
| 2005/0206347 | A1 | 9/2005 | Seo et al. |
| 2006/0028183 | A1 | 2/2006 | Izawa et al. |
| 2006/0051666 | A1 | 3/2006 | Kim |
| 2007/0018780 | A1 | 1/2007 | Furukawa et al. |
| 2007/0026315 | A1 | 2/2007 | Lampe-Onnerud et al. |
| 2007/0120537 | A1 | 5/2007 | Yamamoto |
| 2008/0007211 | A1 | 1/2008 | Poisner |
| 2008/0212643 | A1 | 9/2008 | McGahhey et al. |
| 2009/0011324 | A1 | 1/2009 | Heinrich |
| 2009/0029193 | A1* | 1/2009 | Onnerud et al. .................. 429/7 |
| 2009/0117451 | A1 | 5/2009 | Jung |
| 2009/0167238 | A1 | 7/2009 | McBee |
| 2009/0259420 | A1 | 10/2009 | Greening et al. |
| 2009/0315510 | A1 | 12/2009 | Dos Santos |
| 2011/0210703 | A1 | 9/2011 | Souza et al. |

FOREIGN PATENT DOCUMENTS

| | | |
|---|---|---|
| JP | 2000-37821 | 2/2000 |
| JP | 2001-155693 | 6/2001 |
| JP | 2002-359009 | 12/2002 |
| JP | 2004-179019 | 6/2004 |
| JP | 2006-40879 | 2/2006 |
| JP | 2006-040879 | 2/2006 |
| JP | 2008/295291 | 12/2008 |
| KR | 10-2007-0100957 | 10/2007 |
| TW | 200908415 A | 2/2009 |
| WO | WO 2006/071972 A2 | 7/2006 |

OTHER PUBLICATIONS

Final Office Action for U.S. Appl. No. 12/424,329; Date Mailed: Feb. 28, 2012.
Notice of Grounds for Rejection for Japanese Application No. 2008-521615; Dispatching Date: Feb. 2, 2012.
Invitation to Pay Additional Fees and, Where Applicable, Protest Fee, International Application No. PCT/US2009/040845, date of mailing Oct. 2, 2009.
International Search Report and Written Opinion of the International Searching Authority, or the Declaration, International Application No. PCT/US2009/040845, date of mailing Feb. 3, 2010.
Written Opinion of the International Preliminary Examining Authority, International Application No. PCT/US2009/040839, date of mailing May 4, 2010.
International Preliminary Report on Patentability, International Application No. PCT/US2009/040839, date of mailing Jul. 28, 2010.
International Search Report and Written Opinion from corresponding International Application No. PCT/US2011/026676 mailed Oct. 20, 2011.
Office Action for U.S. Appl. No. 13/037,861, "Thermal Sensor Device With Average Temperature and Hot Spot Feedback" date mailed: Apr. 23, 2013.
Final Office Action for U.S. Appl. No. 12/424,329, "Prismatic Storage Battery or Cell With Flexible Recessed Portion" date mailed Jun. 5, 2013.
Office Action for U.S. Appl. No. 12/727,329 dated Jan. 13, 2014.
English Translation of the Examination Report from Tawain Application No. 099119243, entitled "Prismatic Storage Battery or Cell With Flexible Recessed Portion," Date of Completion of the Search, Oct. 25, 2014.
Office Action from Chinese Application No. 200980114415.9, dated Jun. 17, 2014, English Translation.
Supplementary European Search Report EP 11 75 1194, dated Jun. 2, 2014.
Office Action from Chinese Patent Application No. 201080026412.2, dated May 27, 2014, English Translation.
Office Action from U.S. Appl. No. 12/424,329, dated Oct. 3, 2014.
Office Action from Korean Application 10-2010-7026225, entitled "Prismatic Storage Battery or Cell With Flexible Recessed Portion," dated May 18, 2015.
Office Action from China Application 200980114415.9, entitled "Prismatic Storage Battery or Cell With Flexible Recessed Portion," dated Jan. 12, 2015.
Office Action from China Application 201080026412.2, entitled "Prismatic Storage Battery or Cell With Flexible Recessed Portion," dated Jan. 28, 2015.
Notice of Allowance for U.S. Appl. No. 12/424,329; Date Mailed: Jun. 5, 2015.
Office Action from China Application 201080026412.2, entitled "Prismatic Storage Battery or Cell With Flexible Recessed Portion," dated Jul. 3, 2015.

* cited by examiner

PRISMATIC STORAGE BATTERY OR CELL WITH FLEXIBLE RECESSED PORTION

RELATED APPLICATION

This Application claims the benefit of U.S. Provisional Application No. 61/187,552, filed Jun. 16, 2009, the entire teachings of which are incorporated herein by reference.

INCORPORATION BY REFERENCE

U.S. patent application Ser. No. 12/424,329, filed Apr. 15, 2009; U.S. patent application Ser. No. 12/214,535, filed on Jun. 19, 2008; International Application No. PCT/US2007/014591, filed on Jun. 22, 2007; U.S. patent application Ser. No. 11/474,081, filed on Jun. 23, 2006; U.S. patent application Ser. No. 11/474,056, filed on Jun. 23, 2006; U.S. patent application Ser. No. 11/485,068, filed on Jul. 12, 2006; U.S. patent application Ser. No. 11/486,970, filed on Jul. 14, 2006; U.S. patent application Ser. No. 11/821,102, filed on Jun. 21, 2007; U.S. Patent Application No. 61/208,443, filed on Feb. 24, 2009; U.S. patent application Ser. No. 12/386,266, filed on Apr. 15, 2009; and U.S. patent application Ser. No. 12/386,270, filed on Apr. 15, 2009, are all incorporated herein by reference in their entirety.

BACKGROUND OF THE INVENTION

Li-ion batteries in portable electronic devices typically undergo different charging, discharging and storage routines based on their use. Batteries that employ Li-ion cell chemistry may produce gas when they are improperly charged, shorted or exposed to high temperatures. This gas can be combustible and may compromise the reliability and safety of such batteries. A current interrupt device (CID) is typically employed to provide protection against any excessive internal pressure increase in a battery by interrupting the current path from the battery when pressure inside the battery is greater than a predetermined value.

However, even in the absence of excessive internal pressure that would diminish performance or cause safety concerns, li-ion batteries undergo increased internal pressure during recharging. In prismatic cells, increased internal pressure causes the cell casing to flex. Depending upon the makeup and amount of electrode and electrolyte material within a cell casing, such as a 183665 prismatic cell casing, an outside diameter of about 18.02 mm can increase during recharging by over one millimeter, to about 19.5 mm. Use requirements of many battery types, including prismatic cells, often limit the space available for expansion during charge cycles, thereby restricting the types of batteries employed, their capacity, or the patterns of their use (e.g., removal from devices during charging).

Therefore, a need exists for a cell casing that significantly reduces or eliminates the above-mentioned problems.

SUMMARY OF THE INVENTION

The present invention generally relates to a battery cell casing that includes a recessed portion at a major surface that flexes during cyclic recharging. The invention also relates to batteries that employ the battery cell casing.

In one embodiment, the present invention is directed to a battery cell casing having a recessed portion on a major surface of the casing, the recessed portion being substantially planar and bordering a remainder of the major surface at ridge portions on one or two sides of the recessed portion, whereby the recessed portion, the ridge portions, and the remainder of the major surface cooperate under an increase of gauge pressure to cause a plane defined by a boundary between the ridge portions and the remainder of the major surface to move.

In another embodiment, the invention is directed to a battery that includes a first terminal in an electrical communication with a first electrode of the battery and a second terminal in electrical communication with a second electrode of the battery. The battery also includes a battery can having a cell casing and a lid which are in electrical communication with each other, the battery being electrically insulated from the first terminal. The cell casing has a recessed portion on a major surface of the casing, the recessed portion being substantially planar and bordering a remainder of the major surface at ridge portions on at least three sides of the recessed portion, whereby the recessed portion, the ridge portions, and the remainder of the major surface cooperate under an increase of gauge pressure to cause a plane defined by a boundary between the ridge portions and the remainder of the major surface to move.

In another specific embodiment, the first electrode of the battery is a cathode that includes an active cathode material, wherein the active cathode material includes a lithium cobaltate.

In another specific embodiment, the first electrode of the battery is a cathode that includes an active cathode material, wherein the active cathode material includes a mixture of:
 a) lithium cobaltate; and
 b) a manganate spinel represented by an empirical formula of

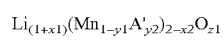

wherein:
 x1 and x2 are each independently equal to or greater than 0.01 and equal to or less than 0.3;
 y1 and y2 are each independently equal to or greater than 0.0 and equal to or less than 0.3;
 z1 is equal to or greater than 3.9 and equal to or less than 4.2; and
 A' is at least one member of the group consisting of magnesium, aluminum, cobalt, nickel and chromium,
wherein the lithium cobaltate and the manganate spinel are in a weight ratio of lithium cobaltate:manganate spinel between about 0.95:0.05 and about 0.6:0.4.

In yet another specific embodiment, wherein the active cathode material of the battery includes a mixture that includes:
 a) $Li_{1+x8}CoO_{z8}$; and
 b) $Li_{(1+x1)}Mn_2O_{z1}$ wherein:
   x1 is equal to or greater than 0.01 and equal to or less than 0.3; and
   z1 is equal to or greater than 3.9 and equal to or less than 4.2,
wherein $LiCoO_2$ and $Li_{(1+x1)}Mn_2O_{z1}$ are in a weight ratio of lithium cobaltate:manganate spinel between about 0.95:0.05 and about 0.6:0.4.

In yet another specific embodiment, at least a portion of the battery can is at least a component of the second terminal, or is electrically connected to the second terminal, and further includes a lid welded on the cell casing and at least one current interrupt device in electrical communication with either of the first or second electrodes. The current interrupt device includes a first conductive plate having a frustum, the frustum including a first end and a second end having a diameter less than that of the first end, and an essentially planar cap sealing the second end of the frustum, wherein the basis proximal to the battery can and the essentially planar cap is distal to the battery can. The second conductive plate is an electrical communication with the first conductive plate and with either of the first and second electrodes, and the weld connecting the first and second plate structures when a gauge pressure between the plates is in a range of between about 4 $kg/cm^2$ and 9 $kg/cm^2$. The cell casing also includes at least one venting means, through which gaseous species inside the battery exit when a gauge pressure is in a range of between about 10 $kg/cm^2$ and about 20 $kg/cm^2$.

The present invention has many advantages. For example, the recessed portion, in combination with the remainder of the major surface of the battery cell casing, can flex as a consequence of increasing gauge pressure caused by, for example, normal recharging of a battery, such as a lithium ion-type battery, employing a cell casing of the invention. The recessed portion, in combination with the ridge portions and the remainder of the major surface, according to the invention, provides some additional structural rigidity to the battery cell casing and, as a consequence, significantly reduces any increase in width of the cell casing from that which would occur without the presence of the recessed portion. It has been discovered, however, that retention of flexibility and consequent increase in volume during recharging cycles, albeit in reduced amounts, essentially preserves battery life, such as in lithium-ion batteries, relative to batteries where no change in internal volume is permitted during recycling. Therefore, battery cycle life can essentially be preserved while significantly reducing volume metric requirements, thereby increasing the flexibility and types of use to which rechargeable batteries can be put.

DETAILED DESCRIPTION OF THE INVENTION

The foregoing will be apparent from the following more particular description of example embodiments of the invention, as illustrated in the accompanying drawings. The drawings are not necessarily to scale, emphasis instead being placed upon illustrating embodiments of the present invention.

As used herein, the "terminals" of the batteries of the invention mean the parts or surfaces of the batteries to which external electric circuits are connected.

The batteries of the invention typically include a first terminal in electrical communication with a first electrode, and a second terminal in electrical communication with a second electrode. The first and second electrodes are contained within the cell casing of a battery of the invention, for example, in a "jelly roll" form. The first terminal can be either a positive terminal in electrical communication with a positive electrode of the battery, or a negative terminal in electrical communication with a negative electrode of the battery, and vice versa for the second terminal. Preferably, the first terminal is a negative terminal in electrical communication with a negative electrode of the battery, and the second terminal is a positive terminal in electrical communication with a positive electrode of the battery.

As used herein, the phrase "electrically connected" or "in electrical communication" means certain parts are in communication with each other by flow of electrons through conductors, as opposed to electrochemical communication which involves flow of ions, such as $Li^+$, through electrolytes.

Figure 1A:
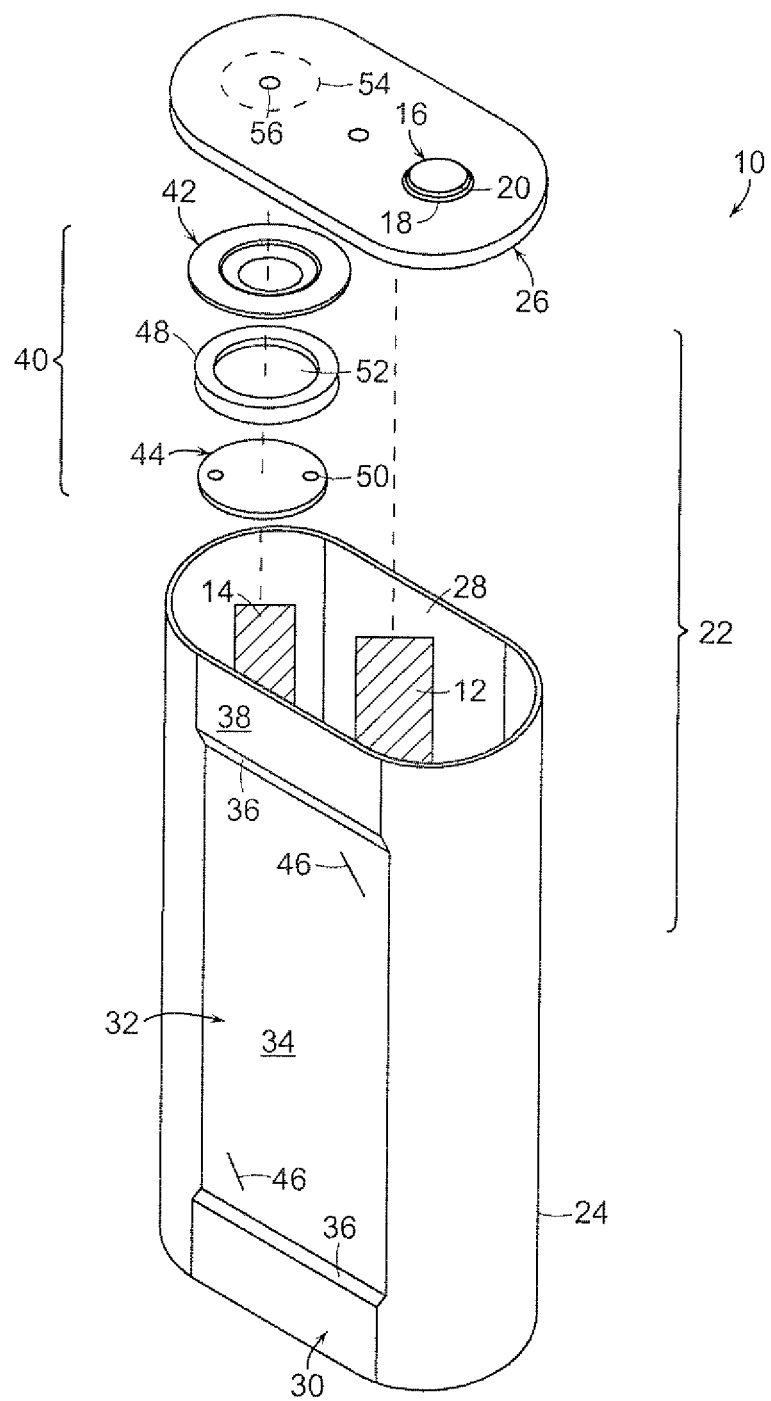
FIG. 1A is a schematic view in perspective of a prismatic battery of one embodiment of the invention.

FIG. 1A shows an exploded view of battery 10 of one embodiment of the invention, in perspective. Battery 10 includes first electrode 12 and second electrode 14. First electrode 12 is electrically connected to feed-through device 16, which includes first component 18, which is proximal to first electrode 12, and second component 20, which is distal to first electrode 12. The electrodes 12, 14 are placed inside battery can 22 that includes cell casing 24 and lid 26, i.e., internal space 28 defined by cell casing 24 and lid 26. Cell casing 24 and lid 26 of battery 10 are in electrical communication with each other.

As used herein, the term "feed-through" includes any material or device that connects electrode 12 of battery 10, within internal space 28 defined by cell casing 24 and lid 26, with a component of the battery external to that defined internal space. Preferably, feed-through device 16 extends through a pass-through hole defined by lid 26. Feed-through device 16 also can pass through lid 26 without deformation, such as bending, twisting and/or folding, and can increase cell capacity. One benefit of using such a feed-through device includes a potential increase (e.g., 5-15%) in cell capacity due to increased volume utilization, as compared to that of a conventional lithium battery in which current-carrying tabs are folded or bent into a cell casing and are welded with internal electrodes. Any other suitable means known in the art can be used in the invention to connect electrode 12 with a component of the battery external to battery can 22, e.g., a terminal of the battery.

Cell casing 24 and lid 26 can be made of any suitable conductive material which is essentially stable electrically and chemically at a given voltage of batteries, such as the lithium-ion batteries of the invention. Examples of suitable materials of cell casing 24 include aluminum, nickel, copper, steel, nickel-plated iron, stainless steel and combinations thereof. Preferably, cell casing 24 is of or includes, aluminum. In a particularly preferred embodiment, cell casing 24 is formed of anodized aluminum. The aluminum of cell casing 24 can be anodized before, during or after shaping an aluminum blank to form cell casing 24. Cell casing 24 can be labeled by any suitable method known in the art, such as is described in U.S. Pat. No. 6,066,412 and WO 00/11731, the teachings of which are incorporated herein by reference. In a preferred embodiment, where cell casing 24 is anodized, a label can be formed on cell casing 24 by use of laser technology, as is known in the art.

Examples of suitable materials of lid 26 are the same as those listed for cell casing 24. Preferably lid 26 is made of the same material as cell casing 24. In a more preferable embodiment, both cell casing 24 and lid 26 are formed of, or include, aluminum. The aluminum of lid 26 can be anodized. Lid 26 can hermetically seal cell casing 24 by any suitable method known in the art. Preferably, lid 26 and cell casing 24 are welded to each other. Also, other forms of electrical connection of lid 26 to cell casing 24 known in the art, such as crimping, can be employed in the invention.

Battery can 22, for example, lid 26, is electrically insulated from feed-through device 16, for example, by an insulating gasket (not shown). The insulating gasket is formed of a suitable insulating material, such as polypropylene, polyvinylfluoride (PVF), etc.

Figure 1B:
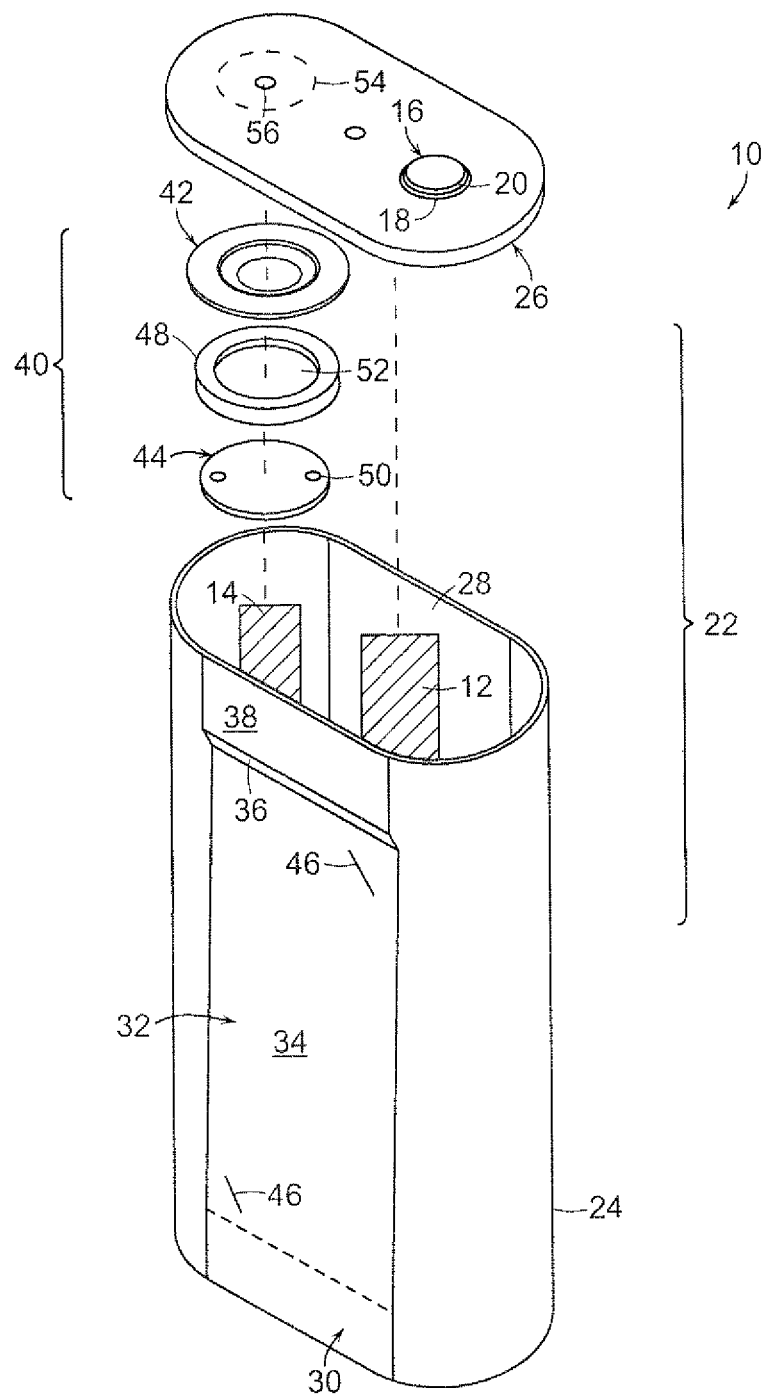
FIG. 1B is a schematic view in perspective of another embodiment of the prismatic battery of the invention.

Cell casing 24 includes major surface 30, which is generally planar relative to the remaining side surfaces of the casing, the remaining side surfaces typically being contoured such that a cross section of the casing has an oblong shape. Cell casing 24 also includes substantially planar recessed portion 32 of major surface area 30, and ridge section 36 on a side of recessed portion 32. A remainder 38 of major surface 30 is defined as the area of major surface 30 excluding recessed portion 32 and ridge portions 36. FIG. 1B shows another embodiment of the invention, wherein there is only one ridge portion 36.

Figure 2A:
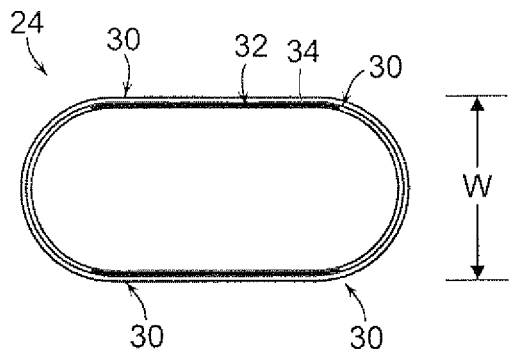
FIG. 2A is a top view of a cell casing of the invention shown in FIG. 1B.
Figure 2D:
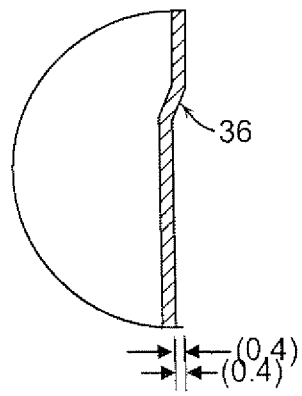
FIG. 2D is a detail of a portion of FIG. 2C.
Figure 2B:
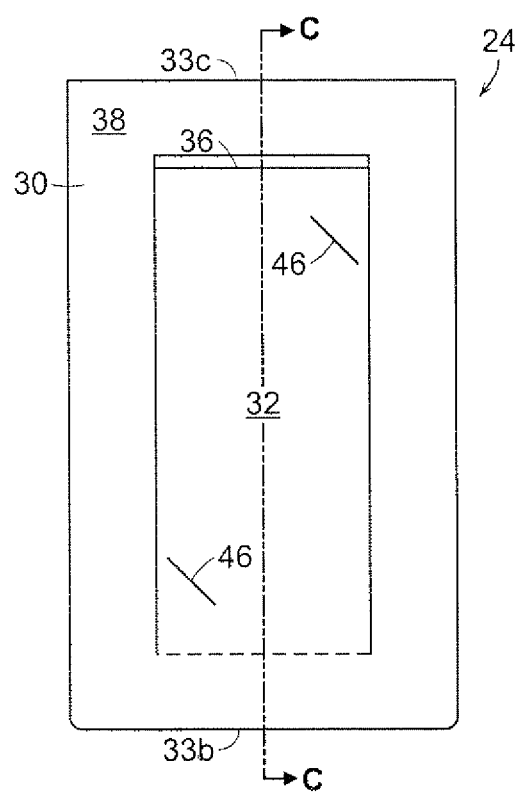
FIG. 2B is a side view of the cell casing of FIG. 2A.

In the embodiment shown in FIGS. 2A-2D, cell casing 24 is a 183665 prismatic cell casing constructed, at least in part, of aluminum. The wall of cell casing 24 is about 0.9 mm thick and width defined by planes at opposing major surfaces of about 18.20 mm. As shown in FIG. 2B, recessed portion 32 has a length of about 37 mm and a width of about 37 mm. Typically, the surface area of recessed portion 32 is in a range of between about 1200 mm$^2$ and about 1400 mm$^2$. In another embodiment, the surface area of the recessed portion is a range of between about 1248 mm$^2$ and about 1352 mm$^2$. At zero gauge pressure, the maximum depth of recessed portion 32 from remainder 38 of major surface 30 is about 0.4 mm. Generally, recessed portion 32 typically will occupy between about 78% and about 85% of generally planar major surface area 30. In another embodiment, recessed portion will occupy between about 75% and about 80% of generally planar surface area 30. In the embodiment of the invention shown in FIG. 2B, ridge sections 36 border at least part of recessed portion 32 on one or two sides of recessed portion 32.

Figure 2C:
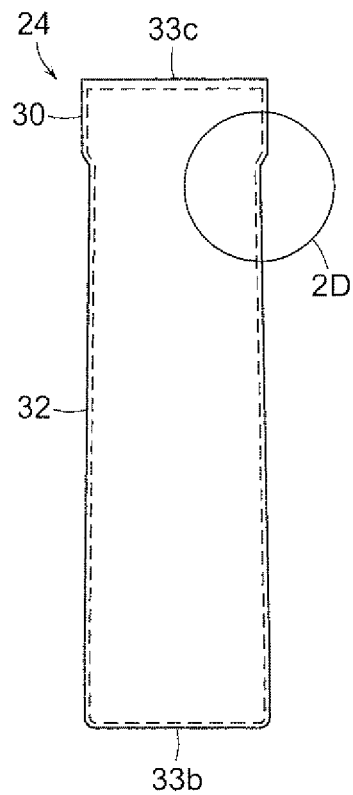
FIG. 2C is a section view of the cell casing of FIG. 2B taken along line CC.

FIGS. 2A and 2B show top and side views, respectively, of the embodiment of cell casing 24 shown in FIG. 1A. In one embodiment, recessed portion 32 has a length of about 37 mm and a width w of about 37 mm. FIG. 2C shows a cross-sectional view of cell casing 24 that shows the contours of one embodiment of the recessed portion 32 when the interior 28 of cell casing 24 is at about zero kilograms per square centimeter (kg/cm$^2$). As used herein, the term "gauge pressure" refers to the difference between the absolute pressure in the battery casing interior and atmospheric pressure. FIG. 2D is a detail of FIG. 2C showing ridge section 36 of recessed portion 32. Recessed portion 32 can be formed by any suitable technique known in the art, such as rolling, stamping, etc.

Figure 3A:
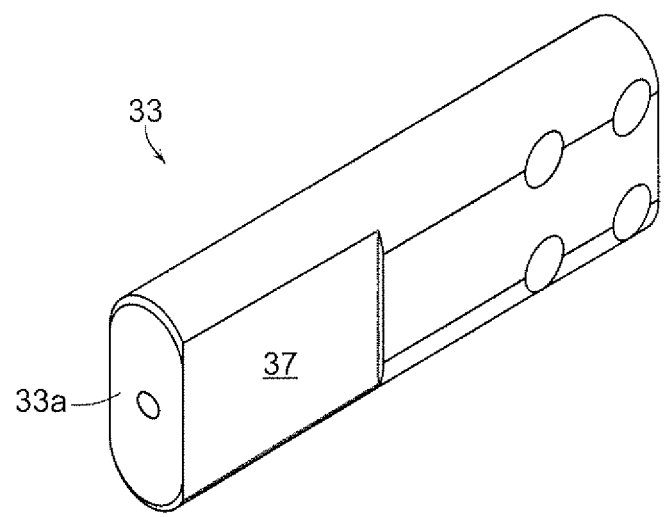
FIG. 3A is an arbor employed in one embodiment to form the cell casing shown in FIGS. 2A through 2D.
Figure 3B:
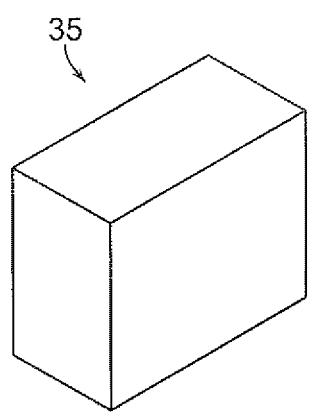
FIG. 3B is a punch employed in one embodiment to form the cell casing shown in FIGS. 2A through 2D.

In a preferred embodiment, recessed portion 32 is formed by use of an arbor 33 and punch 35, shown in FIGS. 3A and 3B, respectively. Arbor 33 includes recess 37. When fabricating a cell casing, not shown, arbor 33 is inserted within the cell casing from an open end of the cell casing so that end 33a of arbor 33 proximates closed end 33b of cell casing 24, shown in FIGS. 2B and 2C. Punch 35, shown in FIG. 3B, is then pressed into recess 37 at an end of recess 37 most proximate to the open end 33c of cell casing 24, thereby forming recessed portion 32 of cell casing 24. Punch 35, shown in FIG. 3B is then removed from cell casing 24 and cell casing 24 can be removed from arbor 33. It is to be understood that, as a consequence of fabrication using arbor 33 and punch 35, recessed portion 32 will be substantially planar and merge into remainder 38 at one end of recessed portion 32, thereby effectively resulting in cell casing 24 substantially as shown in FIG. 2. The shape of cell casing 24 is formed by use of arbor 33 and punch 35 because recess 37 does not match punch 35, in that recess 37 is open on one side to allow cell casing 24 to be removed from arbor 33. In other words, there is effectively no ridge along one side of recessed portion 32.

Figure 4A:
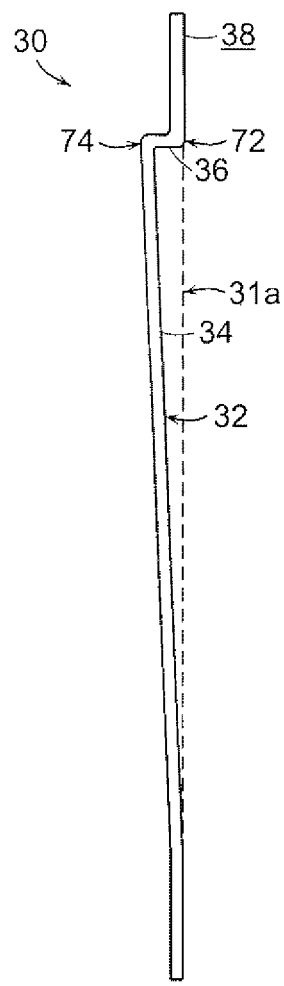
FIG. 4A is a section view of the wall of the cell casing in a non-flexed position.
Figure 4B:
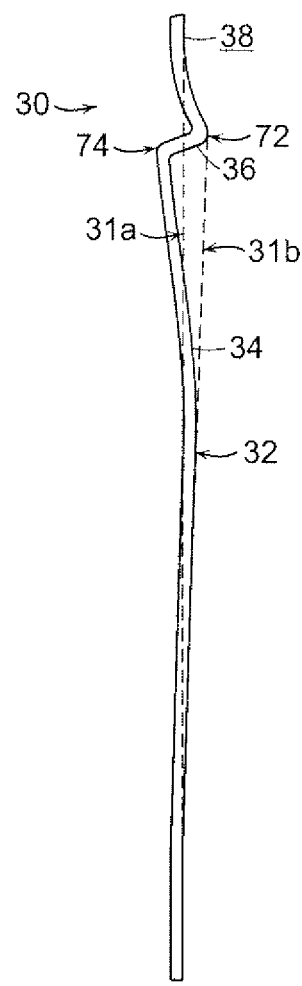
FIG. 4B is a section view of the wall of the cell casing in a flexed position.
Figure 4C:
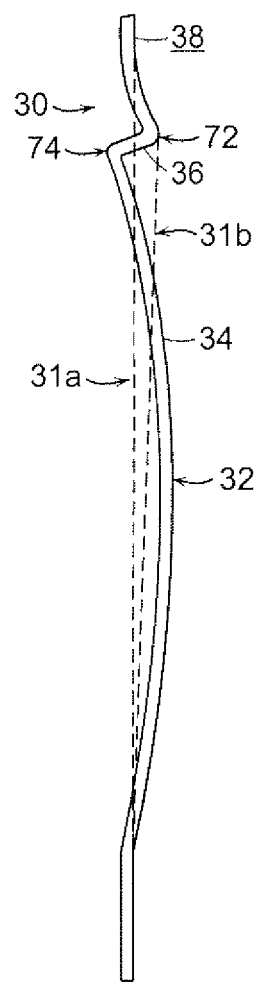
FIG. 4C is a section view of the wall of the cell casing in a further flexed position.

FIGS. 4A-4C are schematic cross-sectional representations of major surface area 30. FIG. 4A shows the major surface area in a non-flexed position, which typifies the shape of the casing when the battery is not being charged, or has an internal gauge pressure when a battery employing the casing is not being charged.

Typically, the gauge pressure of a battery of the invention when not being charged (i.e., when not being introduced to an increase in gauge pressure) is less than about 5 kg/cm$^2$. As shown in FIG. 4A plane 31a, defined by the boundary 72 between ridge section portion 36 and remainder 38 of major surface 30 is substantially aligned with the surface of remainder 38 of major surface 30. This substantial alignment generally defines the original position of the plane at a time prior to undergoing an increase in gauge pressure, which is represented by plane 31a.

When a battery of the invention is being charged, the gauge pressure can rise. As shown in FIG. 4B, when the gauge pressure of a battery of the invention increases, the increase in gauge pressure causes the plane defined by the boundary 72 between ridge portion 36 and remainder 38 of major surface 30 to move away from the original position.

In one embodiment, movement of the plane is a consequence of cooperation between recessed portion 32 and remainder 38 through ridge portion 36. As can be seen in FIG. 4B, flexing of recessed portion 32 forces ridge sections 36, and consequently its boundary 72 with remainder 38, outwardly, thereby moving the plane to a second position. Plane 31b represents the plane in the second position. In the embodiment shown in FIG. 4B, recessed portion 32 flexes during recharging to a point beyond plane 31a, but still within plane 31b.

In one embodiment, at least a portion of recessed portion 32 flexes under an increase of gauge pressure to a point beyond a position of plane 31a prior to the increase of gauge pressure, wherein boundary 74 between ridge portion 36 and recessed portion 32 remains recessed relative to plane 31b defined by boundary 72 between ridge portions 36 and the remainder of major plane 38 up to a gauge pressure of at least 2 kg/cm$^2$. In another embodiment at least a portion of recessed portion 72 flexes under the increase of pressure to a point beyond a position of plane 31b during the increase of gauge pressure, and wherein boundary 74 between the ridge portion 36 and the recessed portion 32 remains recessed relative to plane 31b defined by boundary 72 between ridge portions 36 and the remainder of major plane 38 up to a gauge pressure of at least 4 kg/cm$^2$.

In another embodiment, as shown in FIG. 4C, recessed portion 32 flexes during recharging to a point beyond plane 31b.

In one embodiment a boundary between the ridge portion and the recessed portion remains recessed relative to the plane defined by the boundary between the ridge portions and the remainder of the major plane up to a gauge pressure of at least 4 kg/cm$^2$. In another embodiment, at least a portion of the recessed portion flexes under the increase of gauge pressure to a point beyond a position of the plane prior to the increase of pressure, wherein a boundary between the ridge portion and the recessed portion remains recessed relative to the plane defined by the boundary between the ridge portions and remainder of the major plane up to a gauge pressure of at least 2 kg/cm$^2$.

Figure 5A:
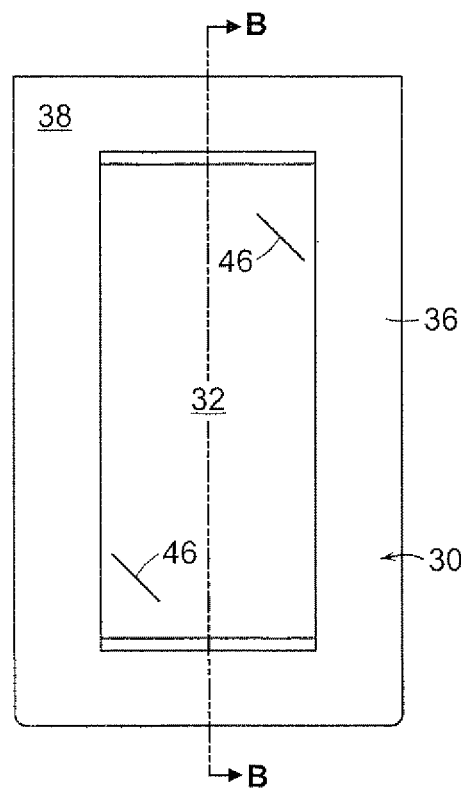
FIG. 5A is a side view of the cell casing of the prismatic battery shown in FIG. 1A.
Figure 5B:
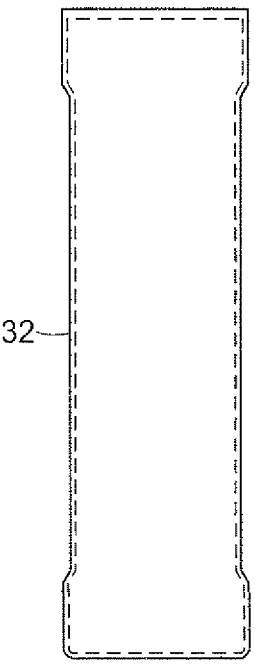
FIG. 5B is a section view of the cell casing of FIG. 5A taken along line BB.
Figure 5C:
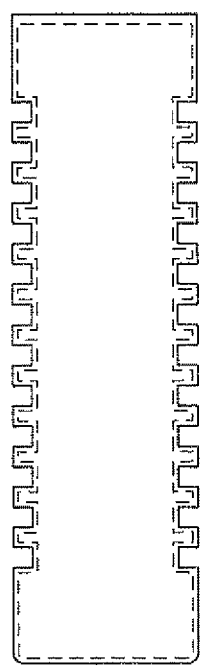
FIG. 5C is a section view of another embodiment of a prismatic battery of the invention.
Figure 6A:
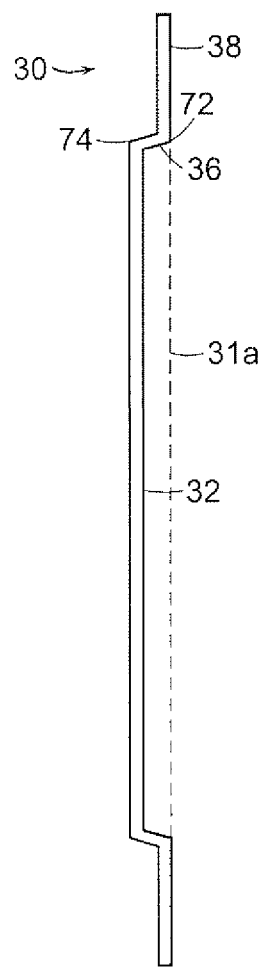
FIG. 6A is a section view of the wall of the cell of the prismatic battery shown in FIG. 1A casing in a non-flexed position.
Figure 6B:
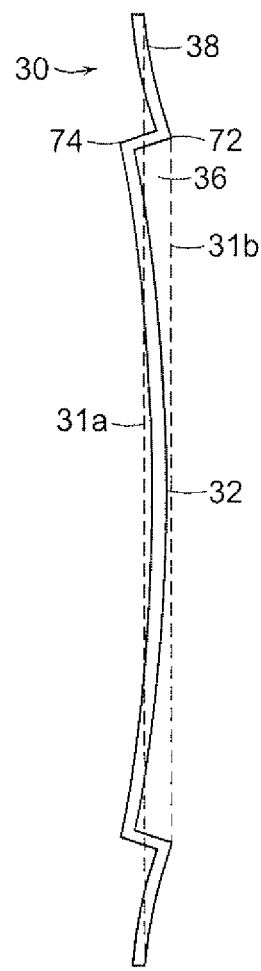
FIG. 6B is a section view of the wall of the cell casing of FIG. 6A in a flexed position.
Figure 6C:
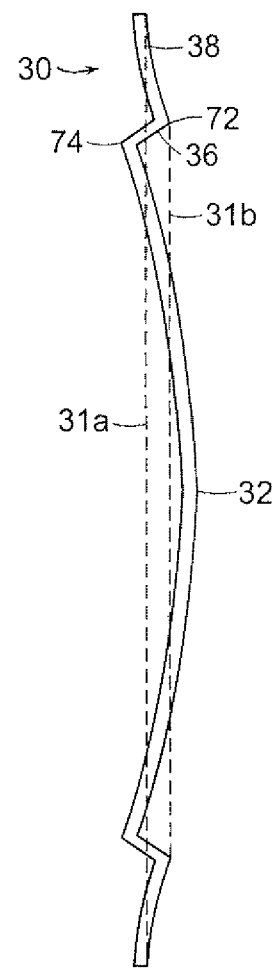
FIG. 6C is a section view of the wall of the cell casing of FIG. 6A in a further flexed position.

In another embodiment, as shown in FIGS. 5A-5B and 6A-6C, ridge portions 36 oppose each other across recessed portion 32, in contrast to the embodiment shown in FIGS. 2B, 2C, and 4A-4C. FIG. 5C shows another embodiment of the invention, wherein a plurality of ridge portion 36 are all essentially parallel to each other. In one embodiment, the height of each ridge portion 36 is, independently, in a range of between about 0.2 mm and about 1.0 mm. In one embodiment the height of each ridge is about 0.4 mm.

Figure 7:
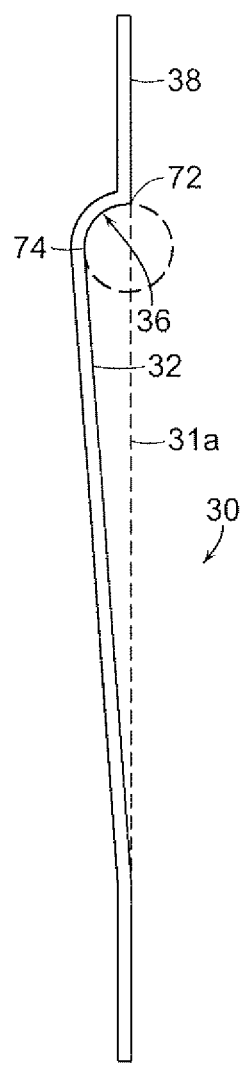
FIG. 7 is a section view of the wall of the cell casing of another embodiment of the invention in a non-flexed position.

In yet another embodiment, as shown in FIG. 7, ridge portions 36 of generally planar major surface 30 has an arc shape, defined, for example, by the radius of a circle. The radius of the circle typically is in a range of between about 0.2 and 1.0 mm. In one embodiment, the radius of the circle is about 0.4 mm. In such cases, the boundary 74 between ridge portion 36 and recessed portion 32 is defined at the point of tangency of recessed portion 74 from the arc.

In all embodiments, the boundary 74 between ridge portion 36 and recessed portion 32 remains recessed relative to the plane defined by the boundary 72 between ridge portions 36 and remainder 38 up to a gauge pressure of at least 40 kg/cm$^2$. Also some embodiments, recessed portion 32 preferably returns to essentially its original position after recharging is complete. In addition, the position of the plane prior to an increase in gauge pressure, i.e., plane 31a, is substantially the same as the position of the plane upon return of the gauge pressure from an increased level.

In one embodiment, the width W of cell casing 24, which includes two recessed portions, one on each opposing side, as shown in FIG. 2A, extends from about 18.02 mm to no more than about 19.5 mm under a gauge pressure of about 12 kg/cm$^2$. In a specific embodiment, cell casing 24 is of anodized aluminum having a width W prior to flexing of about 18.02 mm, and a width W after pressurizing to about 11.14 kg/cm$^2$ of between about 18.4 mm and about 19.0 mm, whereas the same cell casing 24 of aluminum, without anodization, will expand in width W from 18.02 mm to a width W of between about 20.18 mm to about 20.40 mm. It is believed that reducing flex of the battery casing, as in the present invention, causes the gauge pressure to increase beyond what would occur during the same recharging cycle of a typical cell casing, whereby the space required by the battery is reduced, while still allowing the jelly roll of the battery to expand during charging cycles, thereby preserving life of the battery.

Returning to FIG. 1, at least one of cell casing 24 and lid 26 of battery can 22 are in electrical communication with second electrode 14 of battery 10 through CID 40. Battery can 22, i.e., cell casing 24 and lid 26, is electrically insulated from a first terminal of battery 10, and at least a portion of battery can 22 is at least a component of a second terminal of battery 10, or is electrically connected to the second terminal. In a preferred embodiment, at least a portion of lid 26 or the bottom of cell casing 24 serves as a second terminal of battery 10, and feed-through device 16 includes top conductive layer 26, which can serve as a first terminal of battery 10 in electrical communication with first electrode 12. First component 18, second component 20 and top conductive layer 26 each and independently can be made of any suitable conductive material known in the art, for example, nickel.

Battery 10 of the invention includes CID 40. Although one CID 40 is employed in battery 10, more than one CID 40 can be employed in the invention. CID 40 includes first conductive plate 42 and second conductive plate 44 in electrical communication with each other (e.g., by welding, crimping, riveting, etc.). Second conductive plate 44 is in electrical communication with second electrode 14, and first conductive plate 42 is in electrical contact with battery can 22, for example, lid 26.

Figure 8B:
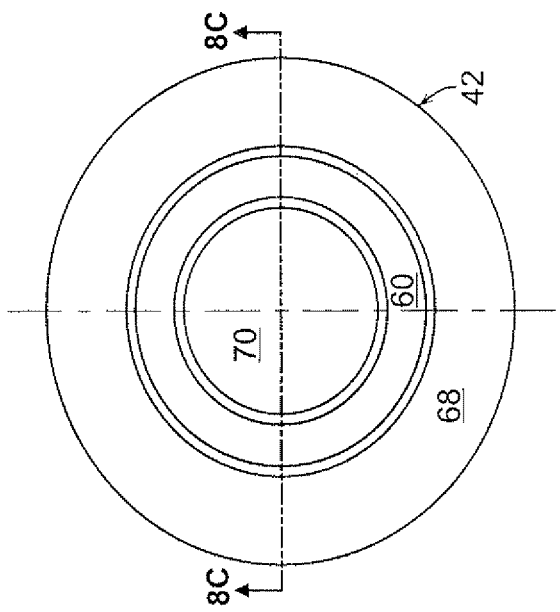
FIG. 8B is a top view of the first conductive plate of the battery of the invention.
Figure 8A:
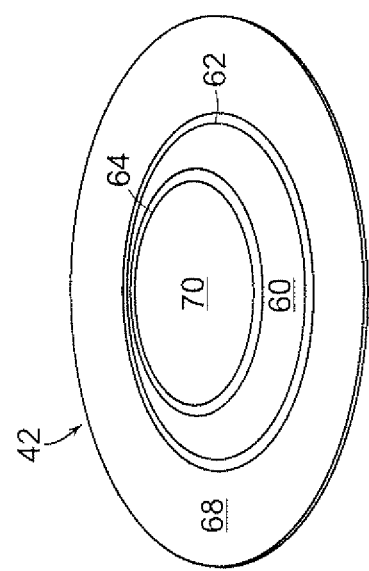
FIG. 8A is a view of the first conductive plate of the battery of the invention.
Figure 8C:
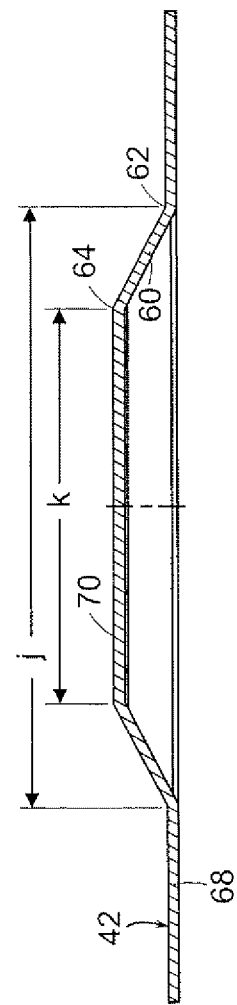
FIG. 8C is a section view of the first conductive plate of FIG. 8B along line AA.

Preferably, the first conductive plate includes a frustum having an essentially planar cap. As shown in FIGS. 8A-8C, first conductive plate 42 includes frustum 60 that includes first end 62 and second end 64. First end 62 has a broader diameter (indicated with reference character "j" in FIG. 4C) than the diameter of second end 64 (indicated with reference character "k" in FIG. 4C). First conductive plate 42 also includes base 68 extending radially from a perimeter of first end 62 of frustum 60. Essentially planar cap 70 seals second end 64 of frustum 60. As used herein, the term "frustum" means the basal wall part (excluding the bottom and top ends) of a solid right circular cone (i.e., solid generated by rotating a right triangle about one of its legs) by cutting off the top intersected between two parallel planes.

In CID 40, second conductive plate 44 separates from (e.g., deforms away or is detached from) first conductive plate 42 when gauge pressure inside the battery is greater than a predetermined value, for example, between about 4 kg/cm$^2$ and about 15 kg/cm$^2$, or between about 5 kg/cm$^2$ and about 10 kg/cm$^2$, whereby a current flow between second electrode 14 and battery can 22, at least a portion of which is at least a component of a second terminal, or is electrically connected to the second terminal, is interrupted.

Preferably, when second conductive plate 44 separates from first conductive plate 42, no rupture occurs in second conductive plate 44 so that gas inside battery 10 does not go out through second conductive plate 44. The gas can exit battery 10 through one or more vent scores 46 (e.g., at cell wall or the bottom part of cell casing 24, or second conductive plate 44), which will be discussed later in detail, when the internal pressure kept increasing and reaches a predetermined value for activation of vent scores 46. In some embodiments, the predetermined gauge pressure value for activation of vent scores 46, for example, between about 10 kg/cm$^2$ and about 20 kg/cm$^2$, is higher than that for activation of CID 40, for example, between about 5 kg/cm$^2$ and about 10 kg/cm$^2$. This feature helps prevent premature gas leakage, which can damage neighboring batteries (or cells) which are operating normally. So, when one of a plurality of cells in the battery packs of the invention is damaged, the other healthy cells are not damaged. It is noted that gauge pressure values or sub-ranges suitable for the activation of CID 40 and those for activation of venting means 58 are selected from among the predetermined gauge pressure ranges such that there is no overlap between the selected pressure values or sub-ranges. Preferably, the values or ranges of gauge pressure for the activation of CID 40 and those for the activation of venting means 58 differ by at least about 2 kg/cm$^2$ pressure difference, more preferably by at least about 4 kg/cm$^2$, even more preferably by at least about 6 kg/cm$^2$, such as by about 7 kg/cm$^2$.

In a preferred embodiment, CID 40 further includes insulator 48 (e.g., insulating layer or insulating gasket) between a portion of first conductive plate 42 and second conductive plate 44. CID 40 is in electrical communication with cell casing 24 of the battery. In CID 40, the second conductive plate 44 separates from (e.g., deforms away or is detached from) the first conductive plate when pressure inside the battery is greater than a predetermined value, for example, an internal gauge pressure in a range of between about 5 kg/cm$^2$ and about 10 kg/cm$^2$, whereby a current flow between the second electrode and the second terminal is interrupted.

In another preferred embodiment, at least one of first conductive plate 42 and insulator 48 of CID 40 includes at least one hole (e.g., holes 50 or 52 in FIG. 1) through which gas within battery 10 is in fluid communication with second conductive plate 44.

In a specific embodiment, CID 40 further includes end plate 54 disposed over first conductive plate 42, and defining at least one hole 56 through which first conductive plate 42 is in fluid communication with the atmosphere outside the battery. In a more specific embodiment, end plate 54 is a part of battery can 22, as shown in FIG. 1 where end plate 54 is a part of lid 26 of battery can 22. In another more specific embodiment, end plate 54 is at battery can 22 of battery 10, for example, over, under or at lid 26 of battery can 22, and in electrical communication with battery can 22.

CID 40 in the invention is placed within battery can 22, or alternatively, a portion of CID 40 is within battery can 22 and another portion of CID 40 is at or above battery can 22. Alternatively, CID 40 can be electrically connected to lid 24 by any suitable means, such as welding, crimping, etc. In a specific embodiment, at least one component of CID 40, first and second conductive plates, 42, 44, insulator 48 and end plate 54, are positioned within battery can 22. In another specific embodiment, at least one component of CID 40, e.g., first and second conductive plates, 42, 44, insulator 48, and end plate 54, is seated within a recess at battery can 22, e.g., lid 24. In yet another specific embodiment, at least one of first and second conductive plates, 42, 44, and end plate 54, is a component of battery can 22, e.g., lid 24, or side or bottom of cell casing 22. In one more specific embodiment, at least one of first and second conductive plates, 42, 44, and end plate 54, is a portion of battery can 22, e.g., lid 24, or side or bottom of cell casing 24. Even more specifically, at least one of first and second conductive plates, 42, 44, and end plate 54, is coined or stamped at lid 26, or the side or the bottom of cell casing 24, preferably at lid 54. In another more specific embodiment, end plate 54 is a part of lid 24 (e.g., coined or stamped), and first and second conductive plates, 42, 44, are placed within cell casing 24, as shown in FIG. 1.

First conductive plate 42 and second conductive plate 44 can be made of any suitable conductive material known in the art for a battery. Examples of suitable materials include aluminum, nickel and copper, preferably aluminum. Preferably, battery can 22 (e.g., cell casing 24 and lid 26), first conductive plate 42 and second conductive plate 44 are made of substantially the same metals. As used herein, the term "substantially same metals" means metals that have substantially the same chemical and electrochemical stability at a given voltage, e.g., the operation voltage of a battery. More preferably, battery can 22, first conductive plate 42 and second conductive plate 44 are made of the same metal, such as aluminum, wherein battery can 22, first conductive plate 42 and second conductive plate 44 are all in electrical communication with the second terminal, and were the second terminal is in electrical communication with second electrode 14, and wherein the second electrode is a cathode.

Cell casing 24 (e.g., the cell wall or the bottom part) includes at least one venting means 58 as a means for venting internal space 28 when necessary, such as when gauge pressure within lithium ion battery 10 is greater than a value of between about 10 kg/cm$^2$ and about 20 kg/cm$^2$. In some embodiments, second conductive plate 44 includes at least one venting means, such as vent scores 46, although it is to be understood that any suitable type of venting means can be employed as long as the means provide hermetic sealing in normal battery operation conditions.

As used herein, the term "score" means partial incision of section(s) of a cell casing, such as cell casing 24, that is designed to allow the cell pressure and any internal cell components to be released at a defined internal gauge pressure, (e.g., between about 10 and about 20 kg/cm$^2$). Preferably, the vent score is directionally positioned away from a user/or neighboring cells. As shown, more than one vent score can be employed. In some embodiments, pattern vent scores can be employed. The vent score can be parallel, perpendicular, diagonal to a major stretching (or drawing) direction of the cell casing material during creation of the shape of cell casing 24. Consideration is also given to vent score properties, such as depth, shape and length (size).

The batteries of the invention can further include a positive thermal coefficient layer (PTC) in electrical communication with either the first terminal or the second terminal, preferably in electrical communication with the first terminal. Suitable PTC materials are those known in the art. Generally, suitable PTC materials are those that, when exposed to an electrical current in excess of a design threshold, its electrical conductivity decreases with increasing temperature by several orders of magnitude (e.g., $10^4$ to $10^6$ or more). Once the electrical current is reduced below a suitable threshold, in general, the PTC material substantially returns to the initial electrical resistivity. In one suitable embodiment, the PTC material includes small quantities of semiconductor material in a polycrystalline ceramic, or a slice of plastic or polymer with carbon grains embedded in it. When the temperature of the PTC material reaches a critical point, the semiconductor material or the plastic or polymer with embedded carbon grains forms a barrier to the flow of electricity and causes electrical resistance to increase precipitously. The temperature at which electrical resistivity precipitously increases can be varied by adjusting the composition of the PTC material, as is known in the art. An "operating temperature" of the PTC material is a temperature at which the PTC exhibits an electrical resistivity about halfway between its highest and lowest electrical resistance. Preferably, the operating temperature of the FTC layer employed in the invention is between about 70° Celsius and about 150° Celsius.

Examples of specific PTC materials include polycrystalline ceramics containing small quantities of barium titanate ($BaTiO_3$), and polyolefins including carbon grains embedded therein. Examples of commercially available PTC laminates that include a PTC layer sandwiched between two conducting metal layers include LIP and LR4 series manufactured by Raychem Co. Generally, the PTC layer has a thickness in a range of about 50 μm and about 300 μm.

Preferably, the PTC layer includes electrically conductive surface, the total area of which is at least about 25% or at least about 50% (e.g., about 48% or about 56%) of the total surface area of lid 26 or the bottom of battery 10. The total surface area of the electrically conductive surface of the PTC layer can be at least about 56% of the total surface area of lid 26 or the bottom of battery 10. Up to 100% of the total surface area of lid 26 of battery 10 can occupied by the electrically conductive surface of the PTC layer. Alternatively, the whole, or part, of the bottom of battery 10 can be occupied by the electrically conductive surface of the PTC layer.

The PTC layer can be positioned internally or externally to the cell can (e.g., lid 22 or the bottom part of cell casing 24), preferably externally to the cell can, for example, over lid 26 of the cell can.

In a preferred embodiment, the PTC layer is between a first conductive layer and a second conductive layer and at least a portion of the second conductive layer is at least a component of the first terminal, or is electrically connected to the first terminal. In a more preferred embodiment, the first conductive layer is connected to the feed-through device. Suitable examples of such a PTC layer sandwiched between the first and second conductive layers are described in U.S. patent application Ser. No. 11/474,081, filed on Jun. 23, 2006, the entire teachings of which are incorporated herein by reference.

In some other embodiments, the cells or batteries of the invention are prismatic, as shown in FIG. 1 (stacked or wound, e.g., 183665 or 103450 configuration). Preferably, the cells or batteries of the invention are of a prismatic shape that is oblong. Although the present invention can use all types of prismatic cell casings, an oblong cell casing is preferred partly due to the two features described below.

The available internal volume of an oblong shape, such as the 183665 form factor, is larger than the volume of two 18650 cells, when comparing stacks of the same external volume. When assembled into a battery pack, the oblong cell fully utilizes more of the space that is occupied by the battery pack. This enables novel design changes to the internal cell components that can increase key performance features without sacrificing cell capacity relative to that found in the industry today. Due to the larger available volume, one can elect to use thinner electrodes, which have relatively higher cycle life and a higher rate capability. Furthermore, an oblong can has larger flexibility. For instance, an oblong shape can flex more at the waist point compared to a cylindrically shaped can, which allows less flexibility as stack pressure is increasing upon charging. The increased flexibility decreases mechanical fatigue on the electrodes, which, in turn, causes higher cycle life. Also, clogging of pores of a separator in batteries can be improved by the relatively lower stack pressure.

A particularly desired feature, allowing relatively higher safety, is available for the oblong shaped battery compared to the prismatic battery. The oblong shape provides a snug fit to the jelly roll, which minimizes the amount of electrolyte necessary for the battery. The relatively lower amount of electrolyte results in less available reactive material during a misuse scenario and hence higher safety. In addition, cost is lower due to a lower amount of electrolyte. In the case of a prismatic can with a stacked electrode structure, whose cross-section is in a rectangular shape, full volume utilization is possible without unnecessary electrolyte, but this type of can design is more difficult and hence more costly from a manufacturing point-of-view.

Preferably, at least one cell has a prismatic shaped cell casing, and more preferably, an oblong shaped cell casing, as shown in FIG. 1. More preferably, at least one cell has an 183665 configuration. Preferably, the capacity of the cells in the battery pack is typically equal to or greater than about 3.0 Ah, more preferably equal to or greater than about 4.0 Ah. The internal impedance of the cells is preferably less than about 50 milliohms, and more preferably less than 30 milliohms.

The lithium-ion batteries and battery packs of the invention can be used for portable power devices, such as portable computers, power tools, toys, portable phones, camcorders, PDAs and the like. In the portable electronic devices using lithium-ion batteries, their charges are, in general, designed for a 4.20 V charging voltage. Thus, the lithium-ion batteries and battery packs of the invention are particularly useful for these portable electronic devices.

The present invention also includes methods of producing a battery, such as a lithium-ion battery, as described above. The methods include forming a cell casing as described above, and disposing a first electrode and a second electrode within the cell casing. A current interrupt device, as described above (e.g., current interrupt device 28), is formed and electrically connected with the cell casing.

Positive and negative electrodes and electrolytes for the lithium-ion batteries of the invention can be formed by suitable methods known in the art.

Examples of suitable negative-active materials for the negative electrodes include any material allowing lithium to be doped or undoped in or from the material. Examples of such materials include carbonaceous materials, for example, non-graphitic carbon, artificial carbon, artificial graphite, natural graphite, pyrolytic carbons, cokes such as pitch coke, needle coke, petroleum coke, graphite, vitreous carbons, or a heat-treated organic polymer compounds obtained by carbonizing phenol resins, furan resins, or similar, carbon fibers, and activated carbon. Further, metallic lithium, lithium alloys, and an alloy or compound thereof are usable as the negative active materials. In particular, the metal element or semiconductor element allowed to form an alloy or compound with lithium may be a group IV metal element or semiconductor element, such as but not limited to, silicon or tin. In particular, amorphous tin that is doped with a transition metal, such as cobalt or iron/nickel, is a metal that is suitable as an anode material in these types of batteries. Oxides allowing lithium to be doped or undoped in or out from the oxide at a relatively basic potential, such as iron oxide, ruthenium oxide, molybdenum oxide, tungsten oxide, titanium oxide, and tin oxide, and nitrides, similarly, are usable as the negative-active materials.

Suitable positive-active materials for the positive electrodes include any material known in the art, for example, lithium nickelate (e.g., $Li_{1+x}NiM'O_2$), lithium cobaltate (e.g., $Li_{1+x}CoO_2$), olivine-type compounds (e.g., $Li_{1+x}FePO_4$), manganate spinel (e.g., $Li_{1+x9}Mn_{2-y9}O_4$ (x9 and y9 are each independently equal to or greater than zero and equal to or less than 0.3) or $Li_{1+x1}(Mn_{1-y1}A'_{y2})_{2-x2}O_{z1})$ (x1 and x2 are each independently equal to or greater than 0.01 and equal to or less than 0.3; y1 and y2 are each independently equal to or greater than 0.0 and equal to or less than 0.3; z1 is equal to or greater than 3.9 and equal to or less than 4.1), and mixtures thereof. Various examples of suitable positive-active materials can be found in International Application No. PCT/US2005/047383, filed on Dec. 23, 2005, U.S. patent application Ser. No. 11/485,068, filed on Jul. 12, 2006, and International Application No. PCT/US2007/014591, filed on Jun. 22, 2007, the entire teachings of all of which are incorporated herein by reference.

In one specific embodiment, the positive-active materials for the positive electrodes of the invention include a lithium cobaltate, such as $Li_{(1+x8)}CoO_{z8}$. More specifically, a mixture of about 60-90 wt % (e.g. about 80 wt %) of a lithium cobaltate, such as $Li_{(1+x8)}CoO_{z8}$, and about 40-10 wt % (e.g., about 20 wt %) of a manganate spinel (e.g., having about 100-115 mAh/g), such as $Li_{(1+x1)}Mn_2O_{z1}$, preferably $Li_{(1+x1)}Mn_2O_4$, is employed for the invention. The value x1 is equal to or greater than zero and equal to or less than 0.3 (e.g., $0.05 \leq x1 \leq 0.15$). The value z1 is equal to or greater than 3.9 and equal to or greater than 4.2. The value x8 is equal to or greater than zero and equal to or less than 0.2. The value z8 is equal to or greater than 1.9 and equal to or greater than 2.1.

In another specific embodiment, the positive-active materials for the invention include a mixture that includes a lithium cobaltate, such as $Li_{(1+x8)}CoO_{z8}$, and a manganate spinel represented by an empirical formula of $Li_{(1+x1)}(Mn_{1-y1}A'_{y2})_{2-x2}O_{z1}$. The values x1 and x2 are each independently equal to or greater than 0.01 and equal to or less than 0.3. The values y1 and y2 are each independently equal to or greater than 0.0 and equal to or less than 0.3. The value z1 is equal to or greater than 3.9 and equal to or less than 4.2. A' is at least one member of the group consisting of magnesium, aluminum, cobalt, nickel and chromium. More specifically, the lithium cobaltate and the manganate spinel are in a weight ratio of lithium cobaltate:manganate spinel between about 0.95:0.05 and about 0.9:0.1 to about 0.6:0.4.

In yet another specific embodiment, the positive-active materials for the invention include a mixture that includes 100% of a lithium cobaltate, such as $Li_{(1+x8)}CoO_{z8}$.

In yet another specific embodiment, the positive-active materials for the invention include at least one lithium oxide selected from the group consisting of: a) a lithium cobaltate; b) a lithium nickelate; c) a manganate spinel represented by an empirical formula of $Li_{(1+x1)}(Mn_{1-y1}A'_{y2})_{2-x2}O_{z1}$; d) a manganate spinel represented by an empirical formula of $Li_{(1+x1)}Mn_2O_{z1}$ or $Li_{1+x9}Mn_{2-y9}O_4$; and e) an olivine compound represented by an empirical formula of $Li_{(1+x10)}A''_{x10}MPO_4$. The values of x1, z1, x9 and y9 are as described above. The value, x2, is equal to or greater than 0.01 and equal to or less than 0.3. The values of y1 and y2 are each independently equal to or greater than 0.0 and equal to or less than 0.3. A' is at least one member of the group consisting of magnesium, aluminum, cobalt, nickel and chromium. The value, x10, is equal to or greater than 0.05 and equal to or less than 0.2, or the value, x10, is equal to or greater than 0.0 and equal to or less than 0.1. M is at least one member of the group consisting of iron, manganese, cobalt and magnesium. A'' is at least one member of the group consisting of sodium, magnesium, calcium, potassium, nickel and niobium.

A lithium nickelate that can be used in the invention includes at least one modifier of either the Li atom or Ni atom, or both. As used herein, a "modifier" means a substituent atom that occupies a site of the Li atom or Ni atom, or both, in a crystal structure of $LiNiO_2$. In one embodiment, the lithium nickelate includes only a modifier of, or substituent for, Li atoms ("Li modifier"). In another embodiment, the lithium nickelate includes only a modifier of or substituent for, Ni atoms ("Ni modifier"). In yet another embodiment, the lithium nickelate includes both the Li and Ni modifiers. Examples of Li modifiers include barium (Ba), magnesium (Mg), calcium (Ca) and strontium (Sr). Examples of Ni modifiers include those modifiers for Li and, in addition, aluminum (Al), manganese (Mn) and boron (B). Other examples of Ni modifiers include cobalt (Co) and titanium (Ti). Preferably, the lithium nickelate is coated with $LiCoO_2$. The coating can be, for example, a gradient coating or a spot-wise coating.

One particular type of a lithium nickelate that can be used in the invention is represented by an empirical formula of $Li_{x3}Ni_{1-z3}M'_{z3}O_2$ where $0.05<x3<1.2$ and $0<z3<0.5$, and M' is one or more elements selected from a group consisting of Co, Mn, Al, B, Ti, Mg, Ca and Sr. Preferably, M' is one or more elements selected from a group consisting of Mn, Al, B, Ti, Mg, Ca and Sr.

Another particular type of a lithium nickelate that can be used in the invention is represented by an empirical formula of $Li_{x4}A^*_{x5}Ni_{(1-y4-z4)}Co_{y4}Q_{z4}O_a$ where x4 is equal to or greater than about 0.1 and equal to or less than about 1.3; x5 is equal to or greater than 0.0 and equal to or less than about 0.2; y4 is equal to or greater than 0.0 and equal to or less than about 0.2; z4 is equal to or greater than 0.0 and equal to or less than about 0.2; a is greater than about 1.5 and less than about 2.1; A* is at least one member of the group consisting of barium (Ba), magnesium (Mg) and calcium (Ca); and Q is at least one member of the group consisting of aluminum (Al), manganese (Mn) and boron (B), Preferably, y4 is greater than zero. In one preferred embodiment, x5 is equal to zero, and z4 is greater than 0.0 and equal to or less than about 0.2. In another embodiment, z4 is equal to zero, and x5 is greater than 0.0 and equal to or less than about 0.2. In yet another embodiment, x5 and z4 are each independently greater than 0.0 and equal to or less than about 0.2. In yet another embodiment, x5, y4 and z4 are each independently greater than 0.0 and equal to or less than about 0.2. Various examples of lithium nickelates where x5, y4 and z4 are each independently greater than 0.0 and equal to or less than about 0.2, can be found in U.S. Pat. Nos. 6,855,461 and 6,921,609 (the entire teachings of which are incorporated herein by reference).

A specific example of the lithium nickelate is $LiNi_{0.8}Co_{0.15}Al_{0.05}O_2$. A preferred specific example is $LiCoO_2$-coated $LiNi_{0.8}Co_{0.15}Al_{0.05}O_2$. In a spot-wise coated cathode, $LiCoO_2$ doe not fully coat the nickelate core particle. The composition of $LiNi_{0.8}Co_{0.15}Al_{0.05}O_2$ coated with $LiCoO_2$ can naturally deviate slightly in composition from the 0.8:0.15:0.05 weight ratio between Ni:Co:Al. The deviation can range about 10-15% for the Ni, 5-10% for Co and 2-4% for Al. Another specific example of the lithium nickelate is $Li_{0.97}Mg_{0.03}Ni_{0.9}Co_{0.1}O_2$. A preferred specific example is $LiCoO_2$-coated $Li_{0.97}Mg_{0.03}Ni_{0.9}Co_{0.1}O_2$. The composition of $Li_{0.97}Mg_{0.03}Ni_{0.9}Co_{0.1}O_2$ coated with $LiCoO_2$ can deviate slightly in composition from the 0.03:0.9:0.1 weight ratio between Mg:Ni:Co. The deviation can range about 2-4% for Mg, 10-15% for Ni and 5-10% for Co. Another preferred nickelate that can be used in the present invention is $Li(Ni_{1/3}Co_{1/3}Mn_{1/3})O_2$, also called "333-type nickelate." This 333-type nickelate optionally can be coated with $LiCoO_2$, as described above.

Suitable examples of lithium cobaltates that can be used in the invention include $Li_{1+x8}CoO_2$ that is modified by at least one of Li or Co atoms. Examples of the Li modifiers are as described above for Li of lithium nickelates. Examples of the Co modifiers include the modifiers for Li and aluminum (Al), manganese (Mn) and boron (B). Other examples include nickel (Ni) and titanium (Ti) and, in particular, lithium cobaltates represented by an empirical formula of $Li_{x6}M'_{y6}Co_{(1-z6)}M''_{z6}O_2$, where x6 is greater than 0.05 and less than 1.2; y6 is greater than 0 and less than 0.1, z6 is equal to or greater than 0 and less than 0.5; M' is at least one member of magnesium (Mg) and sodium (Na) and M'' is at least one member of the group consisting of manganese (Mn), aluminum (Al), boron (B), titanium (Ti), magnesium (Mg), calcium (Ca) and strontium (Sr), can be used in the invention. Another example of a lithium cobaltate that can be used in the invention is unmodified $Li_{1+x8}CoO_2$, such as $LiCoO_2$. In one specific embodiment, the lithium cobaltate (e.g., $LiCoO_2$) doped with Mg and/or coated with a refractive oxide or phosphate, such as $ZrO_2$ or $Al(PO_4)$.

It is particularly preferred that lithium oxide compounds employed have a spherical-like morphology, since it is believed that this improves packing and other production-related characteristics.

Preferably, a crystal structure of each of the lithium cobaltate and lithium nickelate is independently a R-3m type space group (rhombohedral, including distorted rhombohedral). Alternatively, a crystal structure of the lithium nickelate can be in a monoclinic space group (e.g., P2/m or C2/m). In a R-3m type space group, the lithium ion occupies the "3a" site ($x=0$, $y=0$ and $z=0$) and the transition metal ion (i.e., Ni in a lithium nickelate and Co in a lithium cobaltate) occupies the "3b" site ($x=0$, $y=0$, $z=0.5$). Oxygen is located in the "6a" site ($x=0$, $y=0$, $z=z0$, where $z0$ varies depending upon the nature of the metal ions, including modifier(s) thereof).

Examples of olivine compounds that are suitable for use in the invention are generally represented by a general formula $Li_{1-x2}A''_{x2}MPO_4$, where x2 is equal to or greater than 0.05, or x2 is equal to or greater than 0.0 and equal to or greater than 0.1; M is one or more elements selected from a group consisting of Fe, Mn, Co, or Mg; and A'' is selected from a group consisting of Na, Mg, Ca, K, Ni, Nb. Preferably, M is Fe or Mn. More preferably, $LiFePO_4$ or $LiMnPO_4$, or both are used in the invention. In a preferred embodiment, the olivine compounds are coated with a material having relatively high electrical conductivity, such as carbon. In a more preferred embodiment, carbon-coated $LiFePO_4$ or carbon-coated. $LiMnPO_4$ is employed in the invention. Various examples of olivine compounds where M is Fe or Mn can be found in U.S. Pat. No. 5,910,382 (the entire teachings of which are incorporated herein by reference).

The olivine compounds typically have a small change in crystal structure upon charging/discharging, which generally makes the olivine compounds superior in terms of cycle characteristics. Also, safety is generally high, even when a battery is exposed to a high temperature environment. Another advantage of olivine compounds (e.g., $LiFePO_4$ and $LiMnPO_4$) is their relatively low cost.

Manganate spinel compounds have a manganese base, such as $LiMn_2O_4$. While the manganate spinel compounds typically have relatively low specific capacity (e.g., in a range of about 110 to 115 mAh/g), they have relatively high power delivery when formulated into electrodes and typically are safe in terms of chemical reactivity at higher temperatures. Another advantage of the manganate spinel compounds is their relatively low cost.

One type of manganate spinel compounds that can be used in the invention is represented by an empirical formula of $Li_{(1+x1)}(Mn_{1-y1}A'_{y2})_{2-x2}O_{z1}$, where A' is one or more of Mg, Al, Co, Ni and Cr; x1 and x2 are each independently equal to or greater than 0.01 and equal to or less than 0.3; y1 and y2 are each independently equal to or greater than 0.0 and equal to or less than 0.3; z1 is equal to or greater than 3.9 and equal to or less than 4.1. Preferably, A' includes a $M^{3+}$ ion, such as $Al^{3+}$, $Co^{3+}$, $Ni^{3+}$ and $Cr^{3+}$, more preferably $Al^{3+}$. The manganate spinel compounds of $Li_{(1+x1)}(Mn_{1-y1}A'_{y2})_{2-x2}O_{z1}$ can have enhanced cyclability and power compared to those of $LiMn_2O_4$. Another type of manganate spinel compounds that can be used in the invention is represented by an empirical formula of $Li_{(1+x1)}Mn_2O_{z1}$, where x1 and z1 are each independently the same as described above. Alternatively, the manganate spinel for the invention includes a compound represented by an empirical formula of $Li_{1+x9}Mn_{2-y9}O_{z9}$ where x9 and y9 are each independently equal to or greater than 0.0 and equal to or less than 0.3 (e.g., $0.05 \leq x9$, $y9 \leq 0.15$); and z9 is equal to or greater than 3.9 and equal to or less than 4.2. Specific examples of the manganate spinel that can be used in the invention include $LiMn_{1.9}Al_{0.1}O_4$, $Li_{1+x1}$, $Mn_2O_4$, $Li_{1+x7}Mn_{2-y7}O_4$, and their variations with Al and Mg modifiers. Various other examples of manganate spinel compounds of the type $Li_{(1+x1)}Mn_{1-y1}A'_{y2})_{2-x2}O_{z1}$ can be found in U.S. Pat. Nos. 4,366,215; 5,196,270; and 5,316,877 (the entire teachings of which are incorporated herein by reference).

It is noted that the suitable cathode materials described herein are characterized by empirical formulas that exist upon manufacture of lithium-ion batteries in which they are incorporated. It is understood that their specific compositions thereafter are subject to variation pursuant to their electrochemical reactions that occur during use (e.g., charging and discharging).

Examples of suitable non-aqueous electrolytes include a non-aqueous electrolytic solution prepared by dissolving an electrolyte salt in a non-aqueous solvent, a solid electrolyte (inorganic electrolyte or polymer electrolyte containing an electrolyte salt), and a solid or gel-like electrolyte prepared by mixing or dissolving an electrolyte in a polymer compound or the like.

The non-aqueous electrolytic solution is typically prepared by dissolving a salt in an organic solvent. The organic solvent can include any suitable type that has been generally used for batteries of this type. Examples of such organic solvents include propylene carbonate (PC), ethylene carbonate (EC), diethyl carbonate (DEC), dimethyl carbonate (DMC), 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. It is preferred to use cyclic carbonates such as propylene carbonate, or chain carbonates such as dimethyl carbonate and diethyl carbonate. These organic solvents can be used singly or in a combination of two types or more.

Additives or stabilizers may also be present in the electrolyte, such as VC (vinyl carbonate), VEC (vinyl ethylene carbonate), EA (ethylene acetate), TPP (triphenylphosphate), phosphazenes, biphenyl (BP), cyclohexylbenzene (CHB), 2,2-diphenylpropane (DP), lithium bis(oxalato)borate (LiBoB), ethylene sulfate (ES) and propylene sulfate. These additives are used as anode and cathode stabilizers, flame retardants or gas releasing agents, which may make a battery have higher performance in terms of formation, cycle efficiency, safety and life.

The solid electrolyte can include an inorganic electrolyte, a polymer electrolyte and the like insofar as the material has lithium-ion conductivity. The inorganic electrolyte can include, for example, lithium nitride, lithium iodide and the like. The polymer electrolyte is composed of an electrolyte salt and a polymer compound in which the electrolyte salt is dissolved. Examples of the polymer compounds used for the polymer electrolyte include ether-based polymers such as polyethylene oxide and cross-linked polyethylene oxide, polymethacrylate ester-based polymers, acrylate-based polymers and the like. These polymers may be used singly, or in the form of a mixture or a copolymer of two kinds or more.

A matrix of the gel electrolyte may be any polymer insofar as the polymer is gelated by absorbing the above-described non-aqueous electrolytic solution. Examples of the polymers used for the gel electrolyte include fluorocarbon polymers such as polyvinylidene fluoride (PVDF), polyvinylidene-co-hexafluoropropylene (PVDF-HFP) and the like.

Examples of the polymers used for the gel electrolyte also include polyacrylonitrile and a copolymer of polyacrylonitrile. Examples of monomers (vinyl based monomers) used for copolymerization include vinyl acetate, methyl methacrylate, butyl methacylate, methyl acrylate, butyl acrylate, itaconic acid, hydrogenated methyl acrylate, hydrogenated ethyl acrylate, acrylamide, vinyl chloride, vinylidene fluoride, and vinylidene chloride. Examples of the polymers used for the gel electrolyte further include acrylonitrile-butadiene copolymer rubber, acrylonitrile-butadiene-styrene copolymer resin, acrylonitrile-chlorinated polyethylene-propylene-diene-styrene copolymer resin, acrylonitrile-vinyl chloride copolymer resin, acrylonitrile-methacylate resin, and acrylonitrile-acrylate copolymer resin.

Examples of the polymers used for the gel electrolyte include ether based polymers such as polyethylene oxide, copolymer of polyethylene oxide, and cross-linked polyethylene oxide. Examples of monomers used for copolymerization include polypropylene oxide, methyl methacrylate, butyl methacylate, methyl acrylate, butyl acrylate.

In particular, from the viewpoint of oxidation-reduction stability, a fluorocarbon polymer is preferably used for the matrix of the gel electrolyte.

The electrolyte salt used in the electrolyte may be any electrolyte salt suitable for batteries of this type. Examples of the electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, $LiCl$, $LiBr$ and the like. Generally, a separator separates the positive electrode from the negative electrode of the batteries. The separator can include any film-like material having been generally used for forming separators of non-aqueous electrolyte secondary batteries of this type, for example, a microporous polymer film made from polypropylene, polyethylene, or a layered combination of the two. In addition, if a solid electrolyte or gel electrolyte is used as the electrolyte of the battery, the separator does not necessarily need to be provided. A microporous separator made of glass fiber or cellulose material can in certain cases also be used. Separator thickness is typically between 9 and 25 μm.

In some specific embodiments, a positive electrode can be produced by mixing the cathode powders at a specific ratio. 90 wt % of this blend is then mixed together with 5 wt % of acetylene black as a conductive agent, and 5 wt % of PVDF as a binder. The mix is dispersed in N-methyl-2-pyrrolidone (NMP) as a solvent, in order to prepare slurry. This slurry is then applied to both surfaces of an aluminum current collector foil, having a typical thickness of about 20 um, and dried at about 100-150° C. The dried electrode is then calendared by a roll press, to obtain a compressed positive electrode. When $LiCoO_2$ is solely used as the positive electrode a mixture using 94 wt % $LiCoO_2$, 3% acetylene black, and 3% PVDF is typically used. A negative electrode can be prepared by mixing 93 Wt % of graphite as a negative active material, 3 wt % acetylene black, and 4 wt % of PVDF as a binder. The negative mix was also dispersed in N-methyl-2-pyrrolidone as a solvent, in order to prepare the slurry. The negative mix slurry was uniformly applied on both surfaces of a strip-like copper negative current collector foil, having a typical thickness of about 10 um. The dried electrode is then calendared by a roll press to obtain a dense negative electrode.

The negative and positive electrodes and a separator formed of a polyethylene film with micro pores, of thickness 25 um, are generally laminated and spirally wound to produce a spiral type electrode element.

In some embodiments, one or more positive lead strips, made of, e.g., aluminum, are attached to the positive current electrode, and then electrically connected to the positive terminal of the batteries of the invention. A negative lead, made of, e.g., nickel metal, connects the negative electrode, and then attached to a feed-through device, such as feed-through device 16. An electrolyte of for instance EC:DMC:DEC with 1M $LiPF_6$, is vacuum filled in the cell casing of a lithium-ion battery of the invention, where the cell casing has the spirally wound "jelly roll."

EQUIVALENTS

While this invention has been particularly shown and described with references to preferred embodiments thereof, it will be understood by those skilled in the art that various changes in form and details may be made therein without departing from the scope of the invention encompassed by the appended claims.

What is claimed is:

1. A battery casing having a recessed portion on a major surface of the casing, the recessed portion being substantially planar and bordering a remainder of the major surface at a ridge portion only on each of one or two sides of the recessed portion, wherein the ratio of a) the percent surface area of the recessed portion relative to the total surface area of a generally planar surface: b) the depth of the recessed portion relative to the width of the battery casing, is in a range of between about 39:1 and about 42.5:1, and wherein the recessed portion, the ridge portions, and the remainder of the major surface cooperate under an increase of gauge pressure to cause a plane defined by a boundary between the ridge portions and the remainder of the major surface to move, whereby at least a portion of the recessed portion flexes under the increase of gauge pressure to a point beyond a position of where the plane existed prior to the increase of gauge pressure, and wherein a boundary between the ridge portion and the recessed portion remains recessed relative to the plane defined by the boundary between the ridge portions and remainder of the major plane up to a gauge pressure of at least 2 $kg/cm^2$.

2. The battery casing of claim 1, wherein the remainder of the major surface borders the recessed portion at a single ridge portion.

3. The battery casing of claim 1, wherein the remainder of the major surface borders the recessed portion at two ridges.

4. The battery casing of claim 1, wherein the ridge portions oppose each other.

5. The battery casing of claim 1, wherein at least a portion of the recessed portion flexes under the increase of gauge pressure to a point beyond a position of where the plane exists during the increase of gauge pressure, and wherein a boundary between the ridge portion and the recessed portion remains recessed relative to the plane defined by the boundary between the ridge portions and remainder of the major plane up to a gauge pressure of at least 4 $kg/cm^2$.

6. The battery casing of claim 1, wherein the casing is constructed of a material that will cause the recessed portion to return substantially its initial shape and position relative to the plane upon return of the gauge pressure from an increased level.

7. The battery casing of claim 1, wherein the casing is constructed of a material that will cause the position of the plane prior to the increase of gauge pressure to be substantially the same as the position of the plane upon return of the gauge pressure from an increased level.

8. The battery casing of claim 7, wherein the casing is constructed of at least one material selected from the group consisting of aluminum, nickel, copper, steel, nickel plated iron and stainless steel.

9. The battery casing of claim 8, wherein the battery casing is a prismatic battery casing.

10. The battery casing of claim 9, wherein the prismatic battery casing is an oblong prismatic battery cell casing.

11. The battery cell casing of claim 10, wherein casing is constructed of aluminum, and wherein the aluminum is anodized.

12. The battery cell casing of claim 1, wherein a most recessed point of the recessed portion is recessed from the plane defined by the boundary between the ridge portion and the remainder of the major surface in a range of between about 0.3 mm and about 0.5 mm at about zero $kg/cm^2$ gauge pressure.

13. The battery casing of claim 12, wherein the recessed portion has a surface area, in a range of between about 1200 $mm^2$ and about 1400 $mm^2$.

14. A battery, comprising:
a) a first terminal in electrical communication with a first electrode of the battery;
b) a second terminal in electrical communication with a second electrode of the battery; and
c) a battery can having a cell casing and a lid, which are in electrical communication with each other, the battery can being electrically insulated from the first terminal, wherein the cell casing has a recessed portion on a major surface of the casing, the recessed portion being substantially planar and bordering a remainder of the major surface at ridge portions only on each of one or two sides of the recessed portion, wherein the ratio of a) the percent surface area of the recessed portion relative to the total surface area of a generally planar surface: b) the depth of the recessed portion relative to the width of the battery casing, is in a range of between about 39:1 and about 42.5:1, wherein the recessed portion, the ridge portions, and the remainder of the major surface cooperate under an increase of gauge pressure to cause a plane defined by a boundary between the ridge portions and the remainder of the major surface to move, whereby at least a portion of the recessed portion flexes under the increase of gauge pressure to a point beyond a position of the plane prior to the increase of gauge pressure, and wherein a boundary between the ridge portion and the recessed portion remains recessed relative to the plane defined by the boundary between the ridge portions and remainder of the major plane up to a gauge pressure of at least 2 $kg/cm^2$.

15. The battery of claim 14 and further including:
a) a lid welded on the cell casing wherein at least a portion of the battery can is at least a component of the second terminal, or is electrically connected to the second terminal, the welded lid detaching when an internal gauge pressure is equal to, or greater than, about 20 $kg/cm^2$; and
b) at least one current interrupt device in electrical communication with either of the first and second electrodes, the current interrupt device including:
i) a first conductive plate that includes a frustum, the frustum including a first end and a second end having a diameter less than that of the first end, and an essentially planar cap sealing the second end of the frustum, wherein the base is proximal to the battery can and the essentially planar cap is distal to the battery can; and
ii) a second conductive plate in electrical communication with the first conductive plate and with either of the first and second electrodes,
wherein the weld connecting the first and second plates ruptures when a gauge pressure between the plates is in a range of between about 4 $kg/cm^2$ and 9 $kg/cm^2$; and
c) at least one venting means on the cell casing, through which gaseous species inside of the battery exit when an internal gauge pressure is in a range of between about 10 $kg/cm^2$ and about 20 $kg/cm^2$.

16. The battery of claim 15, wherein the cell casing is a prismatic cell casing.

17. A battery casing having a recessed portion on a major surface of the casing, the recessed portion being substantially planar and bordering a remainder of the major surface at a ridge portion only on each of one or two sides of the recessed portion, wherein the ratio of the percent surface area of the recessed portion relative to the total surface area of a generally planar surface to the depth of the recessed portion relative to the width of the casing causes the recessed portion, the ridge portions, and the remainder of the major surface to cooperate under an increase of gauge pressure and thereby cause a plane defined by a boundary between the recessed portion and the remainder of the major surface to move, whereby at least a portion of the recessed portion flexes under the increase of gauge pressure to a point beyond a position of the plane prior to the increase of gauge pressure, and wherein a boundary between the ridge portion and the recessed portion remains recessed relative to the plane defined by the boundary between the ridge portions and remainder of the major plane up to a gauge pressure of at least 2 $kg/cm^2$.

18. The battery casing of claim 17, wherein the recessed portion occupies between about 75% and about 80% of the major surface, the major surface being a generally planar portion of the cell casing.

19. The battery casing of claim 17, wherein the recessed portion occupies between about 78% and about 85% of the major surface, the major surface being a generally planar portion of the cell casing.

20. A battery, comprising a battery casing having a recessed portion on a major surface of the casing, the recessed portion being substantially planar and bordering a remainder of the major surface at a ridge portion only on each of one or two sides of the recessed portion, wherein the ratio of the percent surface area of the recessed portion relative to the total surface area of a generally planar surface to the depth of the recessed portion relative to the width of the casing causes the recessed portion, the ridge portions, and the remainder of the major surface to cooperate under an increase of gauge pressure and thereby cause a plane defined by a boundary between the ridge portions and the remainder of the major surface to move, whereby at least a portion of the recessed portion flexes under the increase of gauge pressure to a point beyond a position of the plane prior to the increase of gauge pressure, and wherein a boundary between the ridge portion and the recessed portion remains recessed relative to the plane defined by the boundary between the ridge portions and remainder of the major plane up to a gauge pressure of at least 2 $kg/cm^2$.

21. The battery of claim 20, wherein the recessed portion of the battery casing occupies between about 75% and about 80% of the major surface, the major surface being a generally planar portion of the cell casing.

22. The battery of claim 20, wherein the recessed portion of the battery casing occupies between about 78% and about 85% of the major surface, the major surface being a generally planar portion of the cell casing.

* * * * *